US010274155B2

(12) United States Patent
Hellin Navarro et al.

(10) Patent No.: US 10,274,155 B2
(45) Date of Patent: Apr. 30, 2019

(54) MIRROR DEVICE FOR MOTOR VEHICLES AND METHOD FOR ASSEMBLING THEREOF

(71) Applicant: FICO MIRRORS, S.A., Barcelona (ES)

(72) Inventors: Sergio Hellin Navarro, Sabadell (ES); Nestor Ruiz Ortega, Terrassa (ES); Maria Luisa Novella, Terrassa (ES); Carles Montero Foix, Sant Feliu de Llobregat (ES); Robert Lopez Galera, Barcelona (ES)

(73) Assignee: FICO MIRRORS, S.A., Barcelona (ES)

( * ) Notice: Subject to any disclaimer, the term of this patent is extended or adjusted under 35 U.S.C. 154(b) by 80 days.

(21) Appl. No.: 14/498,799

(22) Filed: Sep. 26, 2014

(65) Prior Publication Data

US 2015/0085510 A1 Mar. 26, 2015

(30) Foreign Application Priority Data

Sep. 26, 2013 (EP) ..................................... 13186170

(51) Int. Cl.
  *B60Q 1/34* (2006.01)
  *F21S 43/237* (2018.01)
  *B60Q 1/26* (2006.01)
  *B60R 1/12* (2006.01)
  *F21S 43/245* (2018.01)
  *F21S 43/247* (2018.01)

(52) U.S. Cl.
CPC .......... *F21S 43/237* (2018.01); *B60Q 1/2665* (2013.01); *B60R 1/1207* (2013.01); *F21S 43/245* (2018.01); *F21S 43/247* (2018.01); *Y10T 29/49826* (2015.01)

(58) Field of Classification Search
None
See application file for complete search history.

(56) References Cited

U.S. PATENT DOCUMENTS 6,099,153 A 8/2000 Zimmermann et al.
6,299,334 B1 * 10/2001 Schwanz .............. B60Q 1/2665
                                           362/494

(Continued)

FOREIGN PATENT DOCUMENTS

DE   10043101 A1   3/2002
DE 102004015544 A1 11/2004

(Continued)

OTHER PUBLICATIONS

Extended European Search Report for EP13186170 issued by European Patent Office, Berlin, Germany dated Feb. 20, 2014.

*Primary Examiner* — Elmito Breval
(74) *Attorney, Agent, or Firm* — Peter B. Scull; Hamilton, DeSanctis & Cha LLP

(57) ABSTRACT

A mirror device for motor vehicles is provided comprising a main housing and a light guide associated with a light source and attached to the main housing. The light guide extends in at least one portion through the main housing defining at least one housing adapted for receiving the light source. The main housing may comprise a cover and a case; and a housing body may be fitted between the light guide and the cover. The light source housing may be formed at any portion of the length of the light guide.

20 Claims, 2 Drawing Sheets

(56) References Cited

U.S. PATENT DOCUMENTS

| | | | |
|---|---|---|---|
| 6,315,437 B1 * | 11/2001 | Katz | B60Q 1/2665 340/475 |
| 6,637,917 B2 * | 10/2003 | Schwanz | B60Q 1/2665 362/140 |
| 7,357,542 B2 * | 4/2008 | Waldmann | B60Q 1/2665 362/487 |
| 7,357,549 B2 | 4/2008 | Gunther | |
| 7,850,350 B2 | 12/2010 | Weller | |
| 8,177,401 B2 | 5/2012 | Hwang | |
| 2004/0257790 A1 | 12/2004 | Tanaka et al. | |
| 2006/0193144 A1 | 8/2006 | Braeutigam et al. | |
| 2006/0210236 A1 * | 9/2006 | Waldmann | B60Q 1/2665 385/147 |
| 2007/0058383 A1 | 3/2007 | Gunther | |
| 2008/0089080 A1 * | 4/2008 | Kawaji | B60Q 1/2665 362/494 |
| 2009/0046475 A1 | 2/2009 | Weller et al. | |
| 2011/0013409 A1 * | 1/2011 | Hwang | B60Q 1/2665 362/494 |
| 2011/0235353 A1 * | 9/2011 | Fukasawa | B60Q 1/2665 362/494 |
| 2011/0255297 A1 | 10/2011 | Belcher et al. | |
| 2012/0113660 A1 | 5/2012 | Ishikawa | |
| 2012/0147614 A1 * | 6/2012 | Schmierer | B60Q 1/2665 362/494 |

FOREIGN PATENT DOCUMENTS

| | | |
|---|---|---|
| EP | 0858932 A2 | 8/1998 |
| EP | 1022187 A2 | 7/2000 |
| EP | 1391348 A2 | 2/2004 |
| EP | 1657111 A2 | 5/2006 |
| EP | 2028045 A1 | 2/2009 |
| EP | 2119595 A1 | 11/2009 |
| EP | 2258977 A2 | 12/2010 |
| EP | 2277741 A1 | 1/2011 |
| EP | 2377720 A1 | 10/2011 |
| EP | 2481978 A1 | 8/2012 |
| JP | 2006114309 A | 4/2006 |

* cited by examiner

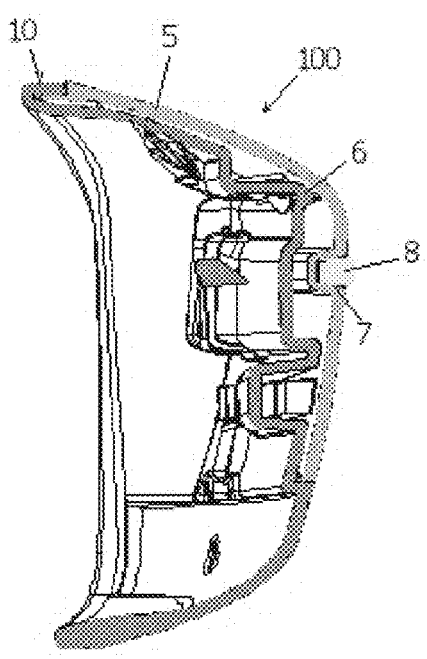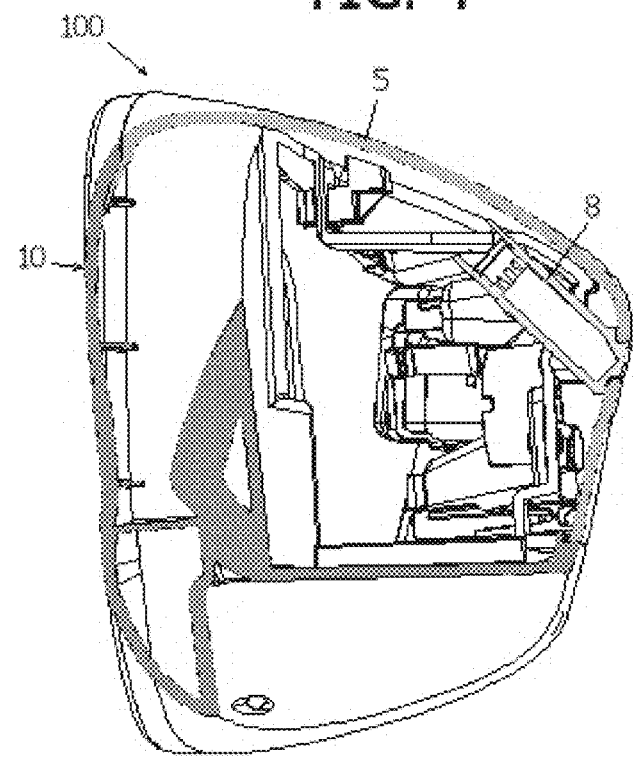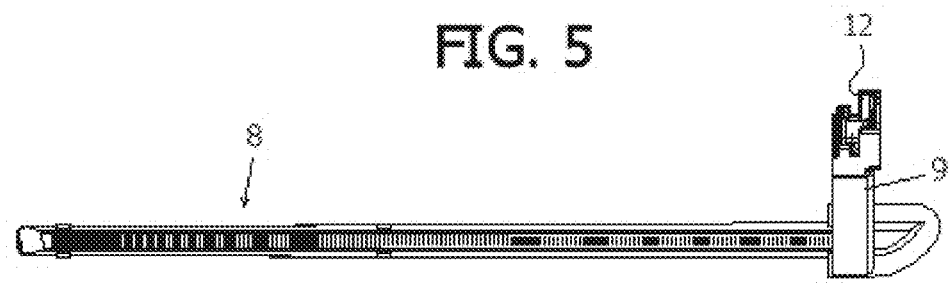

MIRROR DEVICE FOR MOTOR VEHICLES AND METHOD FOR ASSEMBLING THEREOF

A mirror device for motor vehicles and method for assembling thereof is disclosed herein.

BACKGROUND

Mirror devices for motor vehicles are known comprising a housing, a light guide and a light source associated therewith. The light guide transport light from a light source with reduced loss. The light source may include, for example, one or more light emitting diodes (LEDs). The housing of these mirror devices is usually adapted to receive the light guide therein.

In a view to simplify the mirror devices, it has been proposed to adapt the light guide such that the light source can be received therein. For example, document EP2377720 discloses a mirror device with a turn signal indicator provided with a light guide. In this case, the light guide has a recess adapted for receiving the light source therein.

Although a simplified mirror device can be obtained, known solutions within this field still require improvements in terms of efficiency.

SUMMARY

A mirror device for motor vehicles as defined in claim 1 is disclosed herein with which it has been found that with a very simplified configuration a high efficiency is achieved. In addition, a method for assembling such mirror device is also disclosed herein. Advantageous implementations are defined herein as well.

The present mirror device for motor vehicles comprises a main housing, and a light guide associated with a light source. The light guide extends at least substantially overlaying the main housing. The light source may comprise one or more light emitting diodes (LEDs) and one or more corresponding printed circuit boards (PCB). In some implementations there could be a number of LEDs controlled by a single PCB. In any case, the light source is associated with the light guide and the light guide is attached to the main housing, for example in a substantially horizontal position for example where the light guide corresponds to a blinker system integrated in the main housing. Other arrangements are of course possible.

The light guide is configured such that it extends in at least one portion through the main housing, for example passing through a case thereof in examples in which the main housing comprises a cover and a case. According to one important feature of the present mirror device for motor vehicles, the light guide extends in at least one portion through the main housing defining at least one light source housing. The light guide may have at least one optical element arranged along its length to deviate and/or redirect the incident light. Such at least one optical element may include one or a number of suitable marks or lens arranged formed or arranged on surface of the light guide.

Preferably, the light source housing is configured such that it is suitable for preventing light from passing therethrough, especially in the light source housing portion. This can be achieved for example by the material of the light source itself or by providing a suitable optical element thereon. A connector may be provided for closing one end of the light source housing.

The light source housing is adapted for receiving the light source. This light source housing may be formed at any portion of the length of the light guide as necessary. For example, in some examples of the present mirror device, the light source housing may be formed in at least one end portion of the light guide, while in other examples the light source housing may be formed in at least one intermediate portion of the light guide. Still in further examples the light source housing may be formed both in at least one intermediate portion of the light guide and in at least one end portion of the light guide. In any case, the main housing will be provided with at least one opening suitable for inserting corresponding portion(s) of the light guide defining the respective light source housing(s). This advantageously renders the main housing sealed against noise, especially noise caused by the wind, since the light guide itself covers the opening by means of the light source housing.

As stated above, there could be implementations in which the main housing comprises a cover and a case. In such implementations, the cover of the main housing may have a recess suitable for receiving at least partially the light guide therein. The cover of the main housing may be configured so that the light guide may at least partially cover the recess of the cover and so that the light guide is arranged in a substantially horizontal position in the cover as stated above.

In some examples, the light source may be provided at least partially outside the main housing. In general, the above mentioned at least one LED and circuit board PCB of the light source is (are) provided within the light source housing such that both elements of the light source are arranged outside the main housing of the mirror device. Due to the particular positioning of the light source outside the main housing the efficiency of the LED is improved and light loss is minimized in the light guide.

The present mirror device may further comprise a housing body fitted between the light guide and the cover. This housing body may comprise a surface that is at least substantially opaque. In some implementations, such surface of the housing body may be for example a metallized film or surface.

On the other hand, the light guide may have an at least substantially opaque back surface or an at least substantially opaque front surface. In any case the at least substantially opaque surface may be, for example, a textured surface, and more specifically a progressive textured surface. The progressive textured surface may be a rough surface having edges. The height of the rough surface edges is gradually increased as their distance from the light source is increased depending on the desired lighting effect.

A method for assembling said mirror device comprises providing a main housing having an inner side and an outer side, and fitting a light guide, that defines at least one housing for a light source, to the main housing from either the inner or the outer side of the main housing. Due to the particular design of the mirror device, the light guide can be mounted both from the inside and from the outside of the main housing.

The simplified design of the present mirror device involves few parts to be assembled which results in reduced assembling costs in addition to reduced manufacturing costs. It is to be also noted that the assembling method of the present this mirror device does not involve welding or gluing processes for attaching parts further reducing assembling costs.

Additional objects, advantages and features of examples of the present mirror device and a method for assembling such mirror device will become apparent to those skilled in the art upon examination of the description, or may be learned by practice thereof.

BRIEF DESCRIPTION OF THE DRAWINGS

Particular examples of the present mirror device for motor vehicles will be described in the following by way of non-limiting examples, with reference to the appended drawings, in which:

FIG. 3 is a sectional view taken along line B-B in FIG. 1;

FIG. 4 is a sectional view taken along line C-C in FIG. 1; and

FIG. 5 is a front view of one example of a light guide for the example of the mirror device shown in FIG. 1.

DETAILED DESCRIPTION OF EXAMPLES

Figure 1:
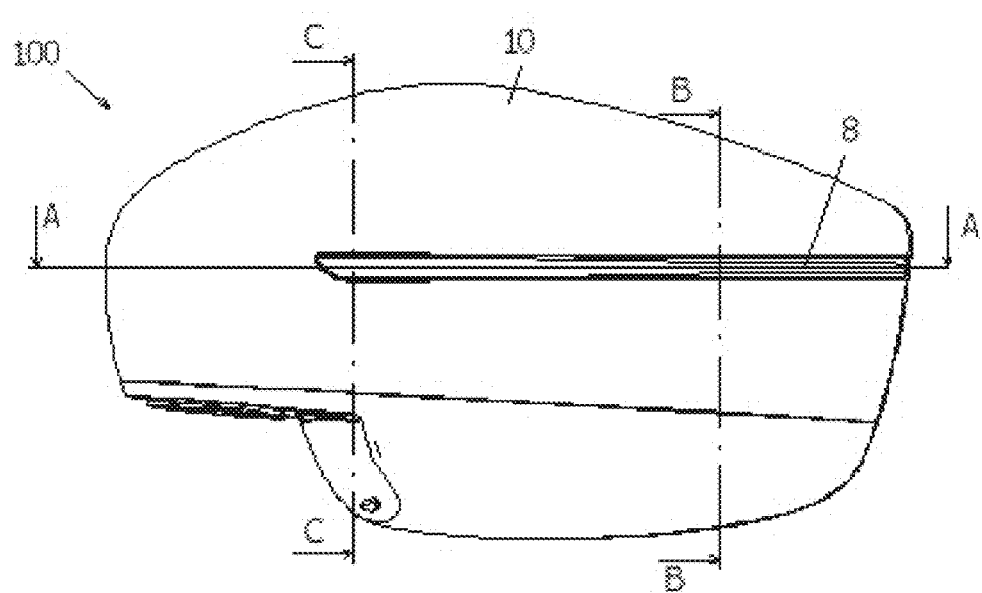
FIG. 1 is a front view of one example of a mirror device for motor vehicles.

FIGS. 1-5 show one non-limiting example of a mirror device for motor vehicles. Like reference numerals refer to like parts throughout the description of several views of the drawings.

In the example of the drawings, specifically in FIGS. 1-4, the mirror device has been indicated as a whole by reference numeral 100. The mirror device 100 is here a rear view mirror device for a motor vehicle and it comprises a main housing 10, a light guide 8 attached thereto and a light source 3 associated therewith. In the specific example shown, the main housing 10 comprises a cover 5 and a case 6.

In the example shown in the drawings, the light source 3 is a tube member arranged outside the main housing 10 and adapted for efficiently transporting and homogeneously distributing the light from the light source 3. The light guide 8 in the example shown corresponds to a blinker system integrated in the main housing 10 and attached thereto. As shown in FIG. 3, the light guide 8 is fitted into a recess 7 formed in the cover 5 and it is arranged such that it substantially fills the entire recess 7 thus defining a closed design.

Figure 2:
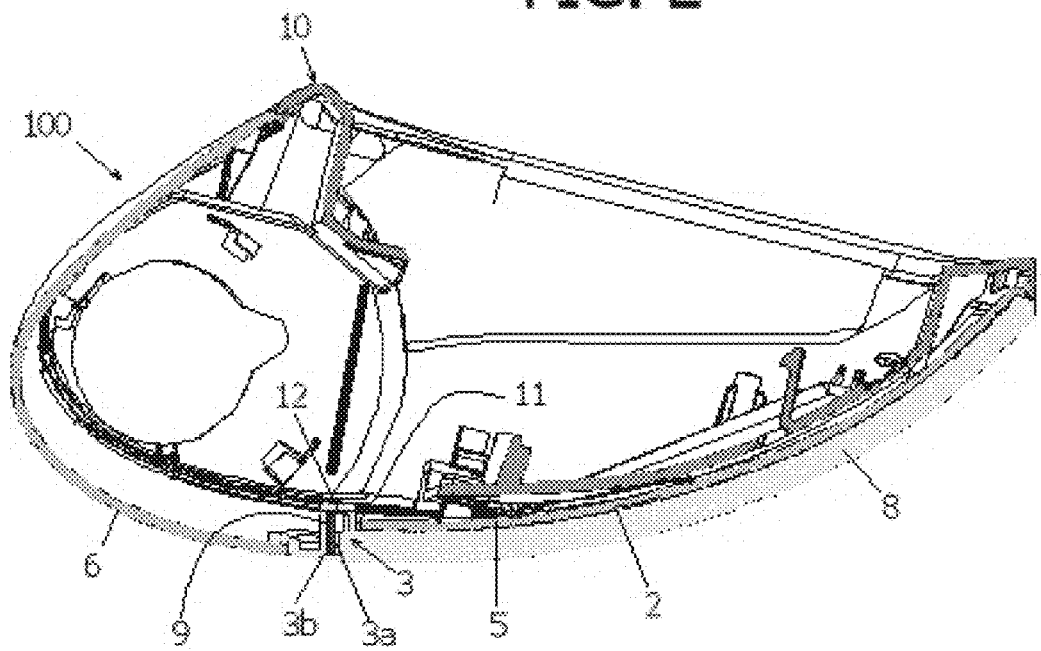
FIG. 2 is a sectional view taken along line A-A in FIG. 1.

As shown in FIG. 2, the light guide 8 extends in one portion inwardly through the main housing 10 defining a light source housing 9 that is adapted for receiving therein the light source 3. Since the light source 3 comprises, in this case one, two, or even more, light emitting diodes (LEDs) 3a and a printed circuit board (PCB) 3b for controlling the LEDs 3a, as shown in FIG. 2, the light source housing 9 is suitably adapted to receive the LEDs 3a and the PCB 3b such that they are encapsulated therein.

In the example as shown in FIG. 2, the light source housing 9 is formed in one end portion of the light guide 8. The light source housing 9, which is part of the light guide 8, passes through an opening 11 formed in the main housing 10. The light source housing 9 is made of a suitable optical material for preventing light from passing therethrough. However, it alternatively may include at least one optical element arranged along its length to deviate and/or redirect the incident light. The light source housing 9 may also have an inner end that is closed by a connector 12 as shown in FIG. 2.

A housing body 2 is fitted between the light guide 8 and the cover 5 as shown in FIG. 2. The light guide 8 may be welded to the housing body 2. The housing body 2 is provided with a surface that is at least substantially opaque, such as for example, a metallized film, a metallized surface, or the like. For its part, the light guide 8 has an at least substantially opaque back surface such as a textured surface and/or more specifically a progressive textured surface whose edges are gradually higher as the distance of said edges from the light source is increased.

For assembling this mirror device 100, a main housing 10 having an inner side and an outer side is provided. Then a light guide 8, having a protrusion defining a light source housing 9 for containing a light source 3, is fitted to the main housing 10 from either the inner or the outer side of the main housing 10. The light source 3 can be then mounted inside the light source housing 9 of the light guide 8 and then close the light source housing 9 by the connector 11 of the main housing 10.

Although only a number of particular examples of the present mirror device for motor vehicles and method for assembling thereof have been disclosed herein, it will be understood by those skilled in the art that other alternative examples and/or uses of the present disclosure and obvious modifications and equivalents thereof are possible. Furthermore, the present disclosure covers all possible combinations of the particular examples described. Reference signs related to drawings and placed in parentheses in a claim, are solely for attempting to increase the intelligibility of the claim, and shall not be construed as limiting the scope of the claim. Thus, the scope of the present disclosure should not be limited by particular examples, but should be determined only by a fair reading of the claims that follow.

What is claimed is:

1. A mirror device for motor vehicles, the mirror device comprising:

a main housing provided with an outermost surface and at least one recess formed in the outermost surface; and a light guide having a light source disposed therewithin, the light guide being attached to the main housing;

the light guide being configured such that it extends in at least one first end portion into the main housing and along its length within the at least one recess formed in the outermost surface of the main housing;

the light guide also including at the first end portion thereof a protrusion having defined therewithin at least one light source housing configured for having the light source disposed therewithin, the light source housing being arranged such that it extends into the interior of the main housing and is part of the outermost surface of the mirror device and arranged in the at least one recess that is formed in the outermost surface of the main housing along and within which the length of the light guide is disposed;

the light source including one or more light emitting diodes (LEDs) and one or more corresponding printed circuit boards (PCBs); the light source housing being configured to receive the one or more LEDs and one or more PCBs such that they are encapsulated therein and thereby within the light guide as well.

2. The mirror device as claimed in claim 1, wherein the light source housing further includes one end that is closed by a connector.

3. The mirror device as claimed in claim 1, the main housing comprising a cover and a case and the cover has defined therein the recess for receiving the light guide.

4. The mirror device as claimed in claim 1, further comprising a housing body fitted between the light guide and the cover.

5. The mirror device as claimed in claim 4, wherein the housing body comprises a surface that is at least substantially opaque.

6. The mirror device as claimed in claim 5, wherein the substantially opaque surface of the light guide is at least one of a textured surface and a progressive textured surface.

7. The mirror device as claimed in claim 1, wherein the light guide has an at least substantially opaque back surface.

8. The mirror device as claimed in claim 7, wherein the substantially opaque back surface of the light guide is at least one of a textured surface and a progressive textured surface.

9. The mirror device as claimed in claim 1, wherein the light guide has an at least substantially opaque front surface.

10. The mirror device as claimed in claim 1, wherein the light source is provided at least partially outside the main housing.

11. A mirror device for motor vehicles, the mirror device comprising:
    a main housing provided with an outermost surface with at least one recess formed therein; and
    an elongated light guide having first and second ends the light guide being attached to the main housing, and
    a light source disposed with the first end of the light guide;
    the light guide being configured such that the first end has a protrusion that extends into the main housing and the light guide being disposed along its length within the at least one recess formed in the outermost surface of the main housing,
    the light guide protrusion also defining at least one light source housing disposed therewithin and configured for receiving the light source therewithin, the light source housing being arranged such that it is part of the outermost surface of the mirror device and arranged in the at least one recess that is formed in the outermost surface of the main housing along which the light guide is arranged;
    wherein the light source housing is configured such that it is suitable for preventing light from passing therethrough.

12. The mirror device as claimed in claim 11, wherein the light source housing is made of a suitable optical material for preventing light from passing therethrough.

13. The mirror device as claimed in claim 11, wherein the light guide has at least one optical element arranged along its length to deviate and/or redirect the incident light.

14. The mirror device as claimed in claim 11, the main housing comprising a cover and a case and the cover has defined therein the recess for receiving the light guide.

15. The mirror device as claimed in claim 11, further comprising a housing body fitted between the light guide and the cover.

16. The mirror device as claimed in claim 15, wherein the housing body comprises a surface that is at least substantially opaque.

17. The mirror device as claimed in claim 11, wherein the light guide has an at least substantially opaque back surface.

18. The mirror device as claimed in claim 11, wherein the light guide has an at least substantially opaque front surface.

19. The mirror device as claimed in claim 11, wherein the light source is provided at least partially outside the main housing.

20. A method for assembling a mirror device for motor vehicles, the mirror device comprising:
    a main housing provided with an outermost surface and at least one recess formed therein; and
    a light guide and a light source disposed therewithin, light guide being attached to the main housing;
    the light guide being configured such that it extends at least at a first end thereof into and through the main housing and along its length within the at least one recess formed in the outermost surface of the main housing;
    the light guide also having a protrusion at the first end thereof defining therewithin at least one light source housing configured for receiving the light source, the light source housing being arranged such that it is part of the outermost surface of the mirror device and arranged in the at least one recess that is formed in outermost surface of the main housing along which the light guide is arranged,
    the light source including one or more light emitting diodes (LEDs) and one or more corresponding printed circuit boards (PCBs) the light source housing being configured to receive the one or more LEDs and one or more PCBs such that they are encapsulated therein,
    the method comprising
    providing the main housing having an inner side and an outer side, and
    fitting the light guide, that defines the at least one light source housing for the light source, to the main housing from either the inner or the outer side of the main housing.

* * * * *